(12) United States Patent
Kwan et al.

(10) Patent No.: US 7,826,352 B2
(45) Date of Patent: Nov. 2, 2010

(54) METER-BASED HIERARCHICAL BANDWIDTH SHARING

(75) Inventors: Bruce Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 106 days.

(21) Appl. No.: 12/198,640

(22) Filed: Aug. 26, 2008

(65) Prior Publication Data

US 2010/0054126 A1 Mar. 4, 2010

(51) Int. Cl.
*G01R 31/08* (2006.01)
(52) U.S. Cl. .................................. 370/229; 370/230.1
(58) Field of Classification Search ................ 370/229, 370/230.1
See application file for complete search history.

(56) References Cited

U.S. PATENT DOCUMENTS

| | | | |
|---|---|---|---|
| 6,970,426 B1 * | 11/2005 | Haddock | 370/235.1 |
| 7,453,892 B2 * | 11/2008 | Buskirk et al. | 370/401 |
| 7,467,223 B2 * | 12/2008 | Wu et al. | 709/238 |
| 7,664,028 B1 * | 2/2010 | Gingras et al. | 370/235 |
| 2006/0098572 A1 * | 5/2006 | Zhang et al. | 370/229 |
| 2006/0187839 A1 * | 8/2006 | Smith et al. | 370/235 |
| 2007/0153682 A1 * | 7/2007 | Swenson et al. | 370/229 |

OTHER PUBLICATIONS

Clark, D. D., et al., "Explicit Allocation of Best-Effort Packet Delivery Service", IEEE/ACM Transactions on Networking, vol. 6, No. 4 (Aug. 1998),12 pages.

Anker, Tal et al., "Hierarchical Bandwidth Sharing made simple", Technical Report HUJI-CSE-LTR-2002-20, The Hebrew University of Jerusalem, Computer Science, (Feb. 2002), 20 pages.

Blake, S. et al., "An Architecture for Differentiated Services", RFC 2475, (Dec. 1998),37 pages.

Heinanen, J. et al., "A Single Rate Three Color Marker", IETF RFC 2697, (Sep. 1999),6 pages.

Heinanen, J. et al., "A Two Rate Three Color Marker", IETF RFC 2698, (Sep. 1999), 5 pages.

(Continued)

*Primary Examiner*—Kwang B Yao
*Assistant Examiner*—Jung Liu
(74) *Attorney, Agent, or Firm*—Brake Hughes Bellermann LLP

(57) ABSTRACT

Example methods and apparatus for hierarchical bandwidth management are disclosed. An example method includes, receiving a data packet in a first data flow and determining if a rate of the first flow is less than or equal to a first threshold. If he first rate is less than or equal to the first threshold, the packet is marked with a first marker type. If the first rate is greater than the first threshold, the packet is marked with a second marker type. The example method further includes combining the first flow with a second data flow to produce a third data flow. If the packet is marked with the first marker type, the packet is forwarded in the third data flow. If the packet is marked with the second marker type and a rate of the third flow is less than or equal to a second threshold, the second marker type is changed to the first marker type and data packet is forwarded in the third flow. If the packet is marked with the second marker type and the rate of third flow is greater than the second threshold, the data packet is discarded.

20 Claims, 8 Drawing Sheets

OTHER PUBLICATIONS

Aboul-Magd, O. et al., "A Differentiated Service Two-Rate, Three-Color Marker with Efficient Handling of in-Profile Traffic", IETF RFC 4115, (Jul. 2005),6 pages.

Floyd, S. et al., "Link-Sharing and Resource Management Models for Packet Networks", IEEE/ACM Transactions on Networking, vol. 3., No. 4 (Aug. 1995), 22 pages.

Bennett, J. et al., "Hierarchical Packet Fair Queuing Algorithms", IEEE/ACM Transactions on Networking, vol. 5, No. 5, (Oct. 1997),14 pages.

Bennett, J. et al., "WF2Q: Worst-case Fair Weighted Fair Queuing", IEEE Infocom 96, (Mar. 1996), p.p. 120-128.

* cited by examiner

|  | MICRO FLOW | MACRO FLOW | FINAL COLOR | MICRO FLOW METER UPDATE | MACRO FLOW METER UPDATE |
|---|---|---|---|---|---|
| 360 | G | G | G | UPDATE | UPDATE |
| 370 | G | R | G | UPDATE | UPDATE |
| 380 | R | G | G | DO NOT UPDATE | UPDATE |
| 390 | R | R | R | DO NOT UPDATE | DO NOT UPDATE |

*FIG. 3* ments US 7,826,352 B2

METER-BASED HIERARCHICAL BANDWIDTH SHARING

TECHNICAL FIELD

This description relates to data and network communications.

BACKGROUND

Data communication applications and the use of data networks continue to grow at a rapid pace. Often networks used for data communication are shared, where different users and/or subscribers communicate data traffic over a common, or shared network. In such situations, data traffic management is typically used to implement predictable bandwidth allocation across the various traffic flows (e.g., among users). Different bandwidth allocation policies may be implemented using such traffic management techniques. For instance, bandwidth may be equally shared across the various traffic flows or bandwidth may be allocated based on an associated class of service for each traffic flow, as two possible examples.

One technique that is used to implement data traffic management in network devices (e.g., network switches or routers), is the use of hierarchical data queues and associated schedulers to control the flow of data traffic. In such an arrangement, respective data queues are used to process each individual traffic flow. For instance, data traffic for each individual user (subscriber) of an Internet Service Provider (ISP) would be processed in a dedicated queue. In such an approach, the associated schedulers then combine the separate traffic flows for each of the individual users (microflows) into one or more larger (e.g., higher bandwidth) traffic flows (macroflows). In such an approach, the hierarchical queues and schedulers are configured to implement bandwidth allocation policies, or perform traffic management. Implementing such bandwidth allocation policies includes deciding which data packets are to be forwarded on to their destination and which packets are to be dropped. These decisions are made, at least in part, based on the specific bandwidth allocation policies being implemented.

However, implementing traffic management using such a hierarchical queuing approach requires implementing complex queuing structures and associated schedulers in network devices that use such techniques to implement bandwidth allocation policies and, therefore, may be cost prohibitive. Further, in network devices that have limited data queuing resources, implementing traffic management using such an approach may be technically impracticable and/or highly inefficient.

SUMMARY

A system and/or method for data communication, substantially as shown in and/or described in connection with at least one of the figures, as set forth more completely in the claims.

BRIEF DESCRIPTION OF THE DRAWINGS

FIG. 3 is a table illustrating an example embodiment of data packet marking that may be employed in conjunction with the apparatus illustrated in FIG. 2.

DETAILED DESCRIPTION

Figure 1:
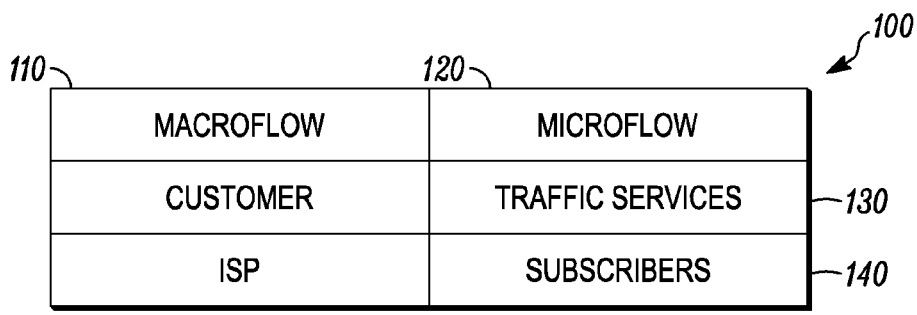
FIG. 1 is a table illustrating example embodiments of data microflows and corresponding data macroflows.

As indicated above, in certain applications, it may be desirable to process data traffic in microflows, where a number of microflows may be combined into one or more higher bandwidth macroflows (e.g., higher bandwidth than the individual microflows). FIG. 1 is a table 100 illustrating two example situations in which such a microflow/macroflow arrangement might be advantageous when implementing a bandwidth allocation and sharing policy.

In the table 100, column 110 indicates the type of macroflow for each example, while column 120 indicates the associated type of microflows that may be combined to produce the macroflow. For instance, in row 130, the macroflow indicated in column 110 is a data traffic flow for a customer, such as an individual network access customer. As shown in row 130, column 120, the microflows that may be combined to produce a customer macroflow are individual traffic services for the customer. Such individual traffic services may include voice data, streaming media, Internet Protocol data, among any number of other possible traffic services.

In row 140, column 110, the indicated macroflow is a data traffic flow for an Internet Service Provider (ISP). In row 140, column 120, the associated microflows for the ISP macroflow are indicated as customer microflows. In such an embodiment, the microflows may each include data traffic for a respective customer of the ISP. The customer microflows may then be combined to produce the ISP macroflow.

As indicated above, microflows and macroflows may be processed using a hierarchical set of data queues and schedulers, where each microflow and macroflow is processed in a dedicated data queue. Such an approach allows for bandwidth allocation and sharing between the various data traffic flows. For example, bandwidth allocation and sharing may be implemented using hierarchical schedulers in such an approach. However, as was discussed above, such an approach may be cost prohibitive and complicated to implement.

Various example embodiments are described herein for implementing meter-based hierarchical bandwidth sharing that may be implemented in devices with limited queuing and scheduling resources, as compared to a hierarchical queuing structure (such as in network devices used to process and route data traffic). For instance, the embodiments described herein may be implemented using a network device with a single data queue to process a plurality of microflows and, likewise, a macroflow or plurality of macroflows, rather than using a dedicated data queue per microflow and/or macroflow. In other embodiments, a plurality of data queuing structures may be used where one or more microflows and/or macro flows are processed in each queuing structure.

As described in detail below, hierarchical bandwidth sharing in such arrangements may be achieved using metering of data traffic flows in conjunction with marking (e.g., color marking) of packets (or any other appropriate data segment, such as a frame (hereafter collectively referred to as "packets")) and, in certain embodiments, preferential packet dropping.

In example embodiments, the packets from each microflow may include a field (such as in a packet header) indicating a particular microflow with which the packet is associated. Such an indication of an associated microflow allows for separate metering and marking of the packets for each individual microflow in order to implement a particular bandwidth sharing policy regardless of whether multiple dataflows (microflows and/or macroflows) are processed in the same data queue structure. Because microflows are combined to produce macroflows, a given packets macroflow may be determined from its microflow designation.

Figure 2:
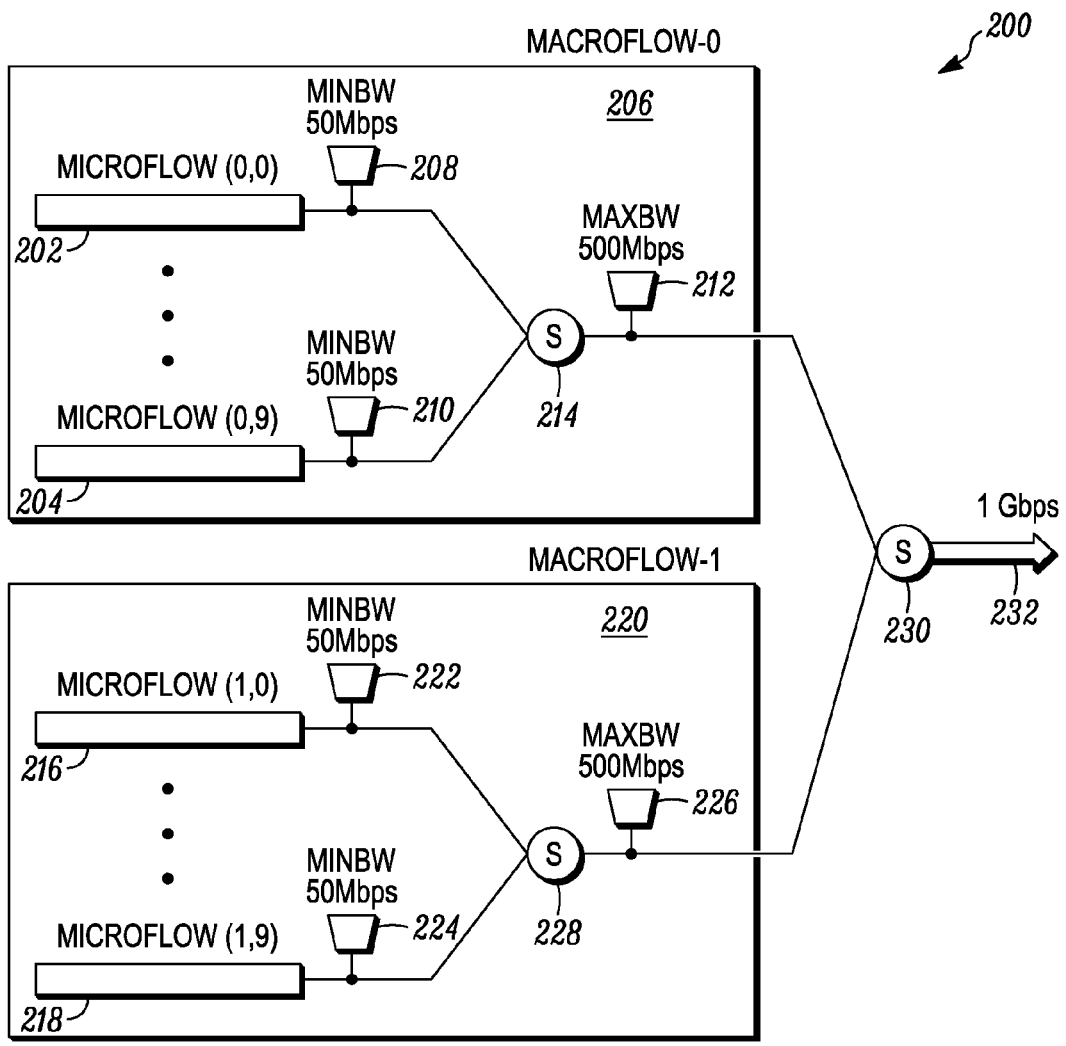
FIG. 2 is block diagram illustrating an example embodiment a data communication apparatus for implementing meter-based hierarchical bandwidth sharing.

FIG. 2 is a block diagram illustrating an apparatus 200 in which meter-based hierarchical bandwidth sharing may be implemented. The apparatus 200 may be a network device with limited data queuing resources (e.g., fewer data queues than a number of individual dataflows being processed). In the apparatus 200, a first set of ten microflows MicroFlow(0, 0) 202 . . . MicroFlow(0,9) 204 may be combined, using a scheduler 214, to form a first macroflow MacroFlow-0 206. As discussed above, the microflows 202 . . . 204 may be processed in single data queue or in a plurality of queues. Also in the apparatus 200, in like fashion as discussed above for MacroFlow-1 206, a second set of ten microflows MicroFlow(1,0) 216 . . . MicroFlow(1,9) 218 may be combined, using a scheduler 228, to produce a second macroflow MacroFlow-1 220.

Still further in the apparatus 200, the MacroFlow-0 206 and the Macro-Flow-1 220 may be combined with one another, using a scheduler 230, to produce a data flow 232. In this instance, the MacroFlow-0 206 and the MacroFlow-1 220 may be considered to be microflows of the data traffic flow 232. For instance, the apparatus 200 may meter and mark packets of the MacroFlow-0 206 and the MacroFlow-1 220 in similar fashion as described below with respect to microflows 202, 204, 216 and 218. Likewise, the apparatus 200 may meter and mark data packets of the data flow 232 in similar fashion as discussed below for the macroflows 206 and 220.

In the apparatus 200, predictable bandwidth allocation for the microflows 202 . . . 204 and 216 . . . 218, as well as the macroflows 206 and 220 may be achieved using meters in conjunction with packet marking. For instance, metering of each microflow may be accomplished using respective token bucket meters (e.g., simple single token bucket meters and/or two-rate, three color token bucket meters) to determine whether each microflow is "in-policy" or "out-of-policy" with respect to a bandwidth allocation and sharing policy.

In an example embodiment, such as shown in FIG. 2, microflows 202 . . . 204 and 216 . . . 218 are metered, respectively, by single token bucket meters 208 . . . 210 and 222 . . . 224. In the apparatus 200, the meters 208, 210, 222 and 224 are used to ensure that bandwidth allocation of at least 50 megabits per second (Mbps) is provided for each of the corresponding microflows. It will be appreciated that this allocation is given merely by way of example and any number of other bandwidth allocation arrangements are possible. For instance, different bandwidths may be allocated to each of the microflows. Also in the apparatus 200, the macroflows 206 and 220 may be metered using simple single token bucket meters to determine whether a maximum bandwidth allocation for each macroflow is being exceeded. As described in detail below, such an arrangement provides for allocating a dedicated amount of bandwidth to each microflow and also provides for use (sharing) of unused macroflow bandwidth by microflows that exceed their dedicated bandwidth allocation.

In allocating data communication bandwidth to the microflows, the sum of the bandwidth allocations for a set of microflows (e.g., microflows 202 . . . 204) should be less than or equal to the bandwidth of the macroflow of which the particular set of microflows are a part of. For example, in FIG. 2, each of the ten microflows (202 . . . 204) that are part of the MacroFlow-0 206 may have a bandwidth allocation of 50 Mbps, while the MacroFlow-0 206 may have a bandwidth of 500 Mbps (i.e., ten times 50 Mbps). Therefore, the sum of the bandwidth allocations for the microflows 202 . . . 204 of MacroFlow-0 206 is equal to the bandwidth of the MacroFlow-0 206.

Other allocations are possible, of course. For instance, the Macro-Flow-0 206 may include three microflows rather than ten microflows. In such a situation, the three microflows may have bandwidth allocations that, in total, are less than or equal to the bandwidth of MacroFlow-0 206. For instance, in this example, one of the microflows may have a bandwidth allocation of 250 Mbps, while the other two microflows may have bandwidth allocations of 125 Mbps each. Again, the sum of the microflow bandwidths would be equal to the bandwidth of the MarcroFlow-0, 500 Mbps. Numerous other bandwidth allocations are possible for the respective microflows of the MacroFlow-0 206 and the MacroFlow-1 220, and the above arrangements are provided by way of example only.

In the apparatus 200, the single token bucket meters 208 . . . 210 and 222 . . . 224 may be used to provide "minimum" bandwidth allocation for their corresponding microflows. For instance, if packets for MicroFlow(0,0) 202 (or any of the other microflows) arrive at a rate that is at or below an allocated data rate for the corresponding microflow (e.g., 50 Mbps in this example), the single token bucket meter 208 would indicate that each of the packets are in profile and the packets may be appropriately marked using a packet marker, such as described below. If, however, packets arrive a rate that is above the allocated data bandwidth for the MicroFlow(0,0), e.g., above 50 Mbps, as least some of the packets will be identified, based on the state of the meter 208 when a given packet is received at the apparatus 200, as being out-of-profile based on the allocated bandwidth. Such out-of-profile packets may be marked accordingly. In this situation, not every packet would be considered to out-of-profile, but only that portion of packets that corresponds with an amount of data traffic in the microflow that is above the allocated bandwidth for the microflow. That is, packets corresponding to the microflow 202's 50 Mbps bandwidth allocation would still be marked as in-profile.

For the single token bucket meters 208 . . . 210 and 222 . . . 224, tokens (or credits) may be periodically added to respective token counts for each of the buckets. The tokens may be added at a rate that corresponds with the allocated bandwidth for the particular microflow, such as 50 Mbps in this example. This rate may be referred to as the Committed Information Rate (CIR) for the microflow. In an example embodiment, the total number of tokens that may be included in a given token count may be limited. This limit may be referred to as "token bucket depth." The number of tokens corresponding with a token bucket depth may also be referred to as a Committed Burst Size (CBS), which represents the instantaneous bandwidth that a particular microflow may consume in such a data communication apparatus.

The single token bucket meters 208 ... 210 and 222 ... 224 may determine whether packets of their corresponding microflows are in profile or out-of-profile based on their token counts. For example, when a packet arrives at the apparatus 200 that is identified (e.g., in its header) as being part of the MicroFlow(0,0) 202, the single token bucket meter 208 may be examined to determine if there is a positive token count. If the meter 208 has a positive token count, the received packet may be marked as being in-profile and a number of tokens corresponding to the size of the packet may be subtracted from the token count for the meter 208.

Conversely, if a packet arrives at the apparatus 200 that is associated with the microflow 202 and the associated token bucket meter 208 has a zero token count, or a negative token count, the received packet may be marked as being out-of-profile. For this particular embodiment, the token count of the meter 208 would not be modified to produce a negative, or further negative token count if the packet is marked as being out-of-profile. However, in other instances, a token count for a meter may be modified (producing a negative, or further negative token count) when a packet is marked as being out-of-profile, such as is some of the example embodiments described below.

In the example apparatus 200, while a limit for dedicated bandwidth allocation for the microflows, e.g., using the meters 208 ... 210 and 222 ... 224 is imposed, a corresponding limit for a maximum bandwidth is not imposed for the individual microflows. In such an arrangement, an upper bandwidth for the microflows may then be limited by the bandwidth allocation of the associated macroflow and the bandwidth usage of related microflows (e.g., microflows of the same macroflow). For instance, for the microflows 202 ... 204, the associated MacroFlow-0 206 has maximum bandwidth allocation of 500 Mbps, which is monitored in similar fashion as the microflows using a single token bucket meter 212. The meter 212 may be used to determine whether the MacroFlow-0 is in-profile or out-of-profile with respect to its 500 Mbps bandwidth allocation. Such an arrangement allows for bandwidth sharing of unused bandwidth. For instance, if only a single microflow, MicroFlow(0,0) 202 is operating at 400 Mbps in the apparatus 200, the apparatus 200 may allow all of the packets in the microflow 202 to be communicated to their destination because the associated MacroFlow-0 206 would remain in profile (e.g., below its 500 Mbps bandwidth allocation).

In such a situation, some packets of the microflow 202 would be marked as in-profile (e.g., packets corresponding with the 50 Mbps bandwidth allocation), while the remaining packets in the microflow 202 would be marked as being out-of-profile (e.g., packets corresponding with the 350 Mbps of bandwidth usage above the 50 Mbps bandwidth allocation). In this instance, it is advantageous to allow the microflow 202 to use the excess bandwidth of the macroflow 206 that is not being used and would be otherwise wasted.

In an example embodiment, such as in the apparatus 200 for the above scenario, the packets in the microflow 202 that were determined (and marked) as being out-of-profile by the meter 208 may be upgraded to being "in-profile" based on the macroflow meter 212. In this example, when a packet arrives at the meter 212, the meter 212 may be examined to determine if a positive token count is present. Because the microflow 202 is the only microflow communicating data (at 400 Mbps), a positive token count would typically exist in the meter 212. Therefore, the packet's marking may be changed from being marked as out-of-profile to being in-profile based on the state of the macroflow meter 212. Accordingly, for the apparatus 200, packets that are marked as out-of-profile by a microflow meter (e.g., 208, 210, 222 and 224) may be upgraded to being in-profile by the corresponding macroflow meters 212 and 226 as long as the respective macroflows 206 and/or 220 remain in-profile, e.g., below their bandwidth allocation.

In the above example, if the remaining microflows that constitute the macroflow 206 began communicating packets at a rate of 50 Mbps (their allocated bandwidths) while the microflow 202 continued to communicate packets a rate of 400 Mbps, the macroflow meter 212 would go out-of-profile and, in this example, discontinue upgrading the packets from the microflow 202 that exceed its 50 Mbps bandwidth allocation. Using such an arrangement, excess bandwidth may be advantageously used by microflows, even though the microflows using the excess bandwidth may be operating above their individual bandwidth allocation. Further, such an arrangement provides a way to ensure that each microflow has uncontested access to its allocated bandwidth.

In the above situation, where a group of microflows begin operating in a substantially simultaneous fashion, the available data queuing resources in an apparatus such as the apparatus 200 should be sufficient to process the packets in such an instance. For example, the amount of data queuing resources available in the apparatus 200 for handling such a situation may be a product of the bucket depths for each of token bucket meters for the associated microflows (i.e., the CBSs of the microflow token bucket meters).

FIG. 3 is a table 300 illustrating an example embodiment for packet marking that may be used in conjunction with the apparatus 200 of FIG. 2 to indicate in-profile and out-of-profile packets and upgrade packets to facilitate unused bandwidth sharing. The example in the table 300 may be applied to individual packets to determine whether a packet is in-profile, or out-of-profile and, if the packet is marked as out-of-profile by a microflow meter, whether the packet should be upgraded.

The packet marking approach illustrated in FIG. 3 will discussed with respect to an individual packet. In the table 300, column 310 indicates the state of a microflow meter when the packet is received. If the microflow meter indicates the microflow is in-profile (e.g., has a positive token count) when the packet is received, the packet is marked as "green" (G). However, if the microflow meter indicates that the microflow is out-of-profile when the packet is received, the packet is marked as "red" (R). The markings in column 310 may be referred to as the microflow "local color," as those markings indicate whether the microflow (e.g., based on its meter) is in or out-of-profile. Therefore the packet markings in column 310 indicate the local state of an associated microflow meter.

Column 320 in FIG. 3 indicates the state of the macroflow meter when the packet is received and may be referred to as the macroflow local color. As with the microflow local color, if the macroflow meter indicates the macroflow is in profile when the packet is received, the packet is marked (locally) as green "G." If the macroflow meter indicates that the macroflow is out-of-profile when the packet is received, the packet is marked locally as red "R."

Column 330 in FIG. 3 indicates what the final color of a packet would be in each instance illustrated in the table 300. In this example, the final color of a packet may depend on its microflow local color and its macroflow local color, as described in further detail below. Columns 340 and 350 indicate, respectively, whether the microflow meter and the macroflow meter are updated (token counts reduced) for a given packet in the various situations illustrated in FIG. 3.

Row 360 of the table 300 illustrates a situation where a packet is marked as "G" by both a microflow meter and a macroflow meter, indicating that the microflow and the macroflow are both in profile. The final color of the packet is marked as "G." In this situation, both the microflow meter and the macroflow meter are updated, e.g., by reducing their token counts by an amount corresponding with the size of the packet.

Row 370 of the table 300 illustrates a situation where a packet is marked as "G" by a microflow meter and "R" by a macroflow meter. The final color of the packet is marked as "G" even though the macroflow meter indicates the macroflow is out-of-profile. Such an outcome may ensure the microflow's guaranteed bandwidth allocation. Because the packet was locally marked as "G" by the microflow meter, that indicates that the microflow is in profile and the packet should be forwarded on in the macroflow, not discarded. In this situation, both the microflow meter and the macroflow meter are updated. Because the microflow meter is in profile, the token count would be positive when the packet arrives. However, the macroflow meter is out-of-profile when the packet arrives, as the packet is marked "R" locally by the macroflow meter. Therefore, updating the macroflow meter will cause it to go negative or further negative in this instance. Such an approach may be advantageous in the situation described above where a single microflow is using excess bandwidth when multiple other microflows begin transmitting data at their allocated rates. By allowing the macroflow meter's token count to go negative, this will prevent the macroflow meter from upgrading any packets until the macroflow meter's token count becomes positive again. In this situation, each operating microflow would be allowed to transmit at data rates up to their respective allocated bandwidths, in accordance with the marking arrangement illustrated in row 370 of the table 300. Depending on the particular embodiment, the extent to which the macroflow meter's token count can go negative may be bounded to prevent the macroflow meter's token count from going further negative indefinitely.

Row 380 of the table 300 illustrates the situation where a packet receives an upgrade. As indicated in column 310, the packet is locally marked "R" by the microflow meter. As indicated in column 320, the packet is then locally marked "G" by the macroflow meter. This indicates that the individual microflow is out-of-profile (e.g., the microflow meter has a zero or negative token count), but that the macroflow is in profile (e.g., the macroflow meter has a positive count). In this example, the packet is then "upgraded" and marked with a final color of "G," indicating that the packet should be forwarded on in the macroflow and not discarded. Techniques for discarding packets based on their final color are discussed in further detail below.

In the situation illustrated in row 380 of the table 300, the microflow meter is not updated and the macroflow meter is updated. Because the packet is upgraded to allow the opportunistic use of excess bandwidth by the out-of-profile microflow, updating the out-of-profile microflow meter could unnecessarily penalize that microflow for utilizing the excess bandwidth. For instance, allowing the microflow meter token count to go negative, or further negative may prevent the microflow from accessing its allocated (e.g., guaranteed) bandwidth once the other microflows begin to transmit until the microflow meter's token count is restored to a positive value by the periodic adding of tokens to its token count.

Row 390 of the table 300 illustrates the situation where both the microflow and the macroflow are out-of-profile. In this situation, the packet would be marked locally "R" for both the microflow and macroflow, as indicated in columns 310 and 320. As also shown in column 330, this would result in a final color of "R" for the packet. In this situation, neither the microflow meter nor the macroflow meter would be updated and the packet, typically would be dropped as being out-of-profile and not upgraded due to the unavailability of excess bandwidth in the macroflow.

Figure 4:
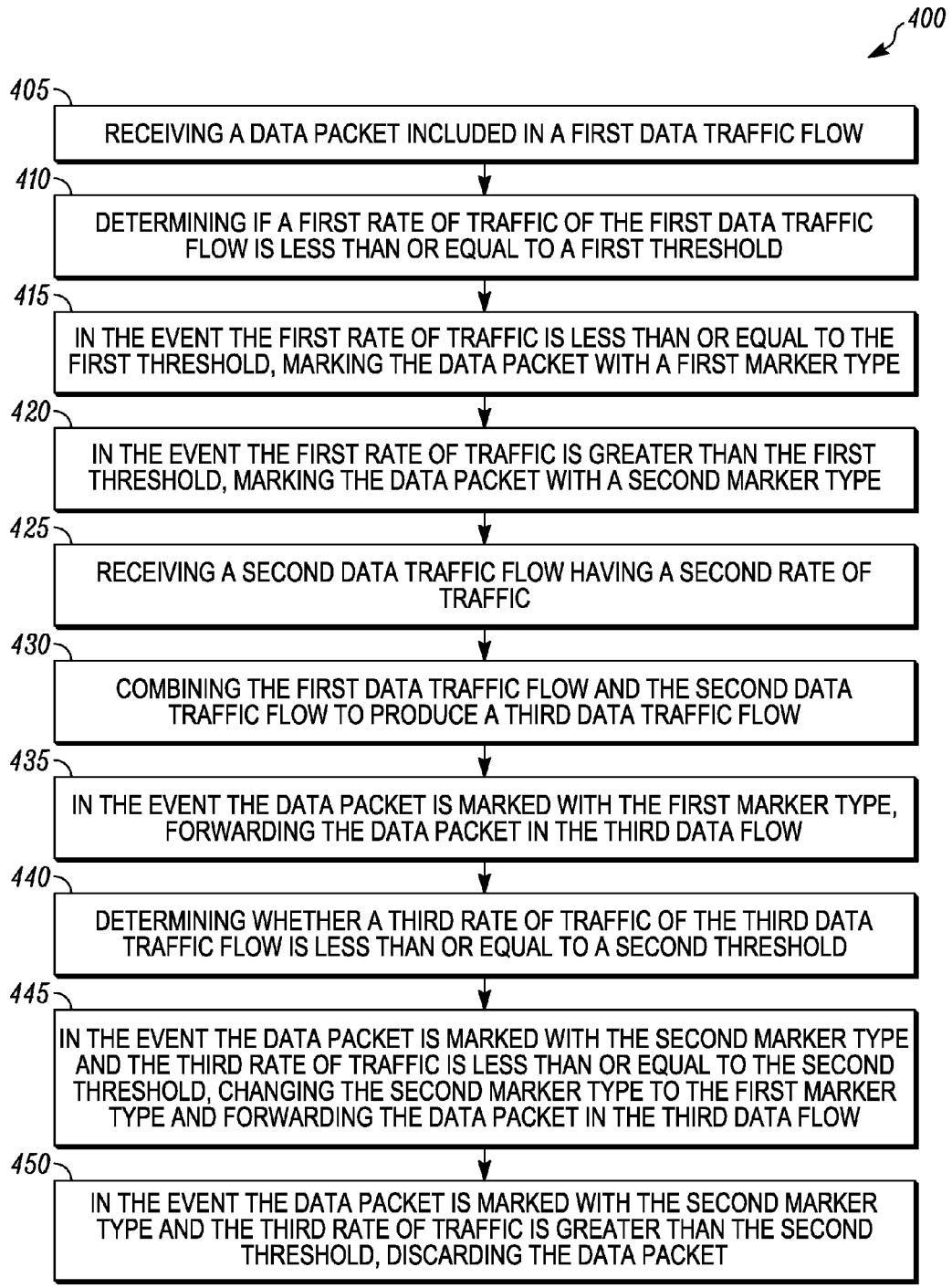
FIG. 4 is a flowchart illustrating an example embodiment of a method for data communication that may be implemented in the apparatus illustrated in FIG. 2.

FIG. 4 is a flowchart illustrating an example embodiment of a method 400 for data communication that may be implemented in the apparatus 200 of FIG. 2 using the packet marking illustrated in FIG. 3. The method 400 may, of course, be implemented in any number of other data communication apparatus, such as the apparatus 500 illustrated in FIG. 5, for example. For the below discussion, the method 400 will be described with reference to FIG. 4 and additional reference to FIGS. 2 and 3.

At block 405 of the method 400, a data packet is received as part of a first data traffic flow. The packet may be, for example, part of a first microflow, such as the microflow 202. At block 410, it is determined whether a first rate of traffic of the first data traffic flow is less than or equal to a first threshold. For instance, the token bucket meter 208 may be examined. If a positive token count is present in the meter 208, the first rate of traffic would be determined to be less than or equal to the first threshold (e.g., an allocated or "guaranteed" data rate). If the meter 208 has a zero or negative token count, the first rate of traffic would be determined to be greater than the first threshold.

At block 415, in the event the first rate of traffic is determined to be less than or equal to the first threshold, the packet may be marked with a first marker type, e.g., "G" as the local microflow color, as discussed above. At block 420, in the event the first rate of traffic is greater than the first threshold, the packet may be marked with a second marker type, e.g., "R" as the local microflow color, as described above with respect to FIG. 3.

The method 400 further includes, at block 425, receiving a second data traffic flow having a second rate of traffic, such as a second microflow 204. At block 430, the first data traffic flow (microflow 202) may be combined with the second data traffic flow (microflow 204) to produce a third data traffic flow. For instance, in the apparatus of FIG. 2, the microflows 202 and 204 may be combined using the scheduler 214 to produce the MacroFlow-0 206.

At block 435, in the event the data packet was marked with the first marker type (e.g., locally "G" by the microflow meter 208) the packet may be forwarded as part of the third data flow regardless of a rate of traffic for the third data traffic flow (macroflow 206). This situation is represented by rows 360 and 370 of the table 300 illustrated in FIG. 3. In this situation, the local macroflow color could be determined, as described below, and meter updates performed in accordance with the table 300 illustrated in FIG. 3.

At block 440, it may be determined whether a third rate of traffic of the third data traffic flow is less than or equal to a second threshold (e.g., the upper bandwidth limit for the macroflow 206, in this case 500 Mbps). In the apparatus 200, this determination could be made based on the state of the macroflow meter 212. If the meter 212 has a positive token count when the packet is received, that would indicate that the third rate of traffic is less than or equal to the second threshold (e.g., the macroflow 206 is in-profile). If the meter 212 has a zero or negative token count, that would indicate that the third rate of traffic is greater than the second threshold (e.g., the macroflow 206 is out-of-profile).

At block 445, in the event the data packet is marked with the second marker type (e.g., locally "R" for the microflow 202) and the third rate of traffic is less than or equal to the second threshold (e.g., locally "G" for the macroflow 206), the marker type for the packet may be changed from the second marker type (local microflow color of "R") to the first marker type (final color of "G"). This illustrates the situation in row 380 of the table 300, where a packet marked "R" from an out-of-profile microflow is upgraded to "G" in order to opportunistically take advantage of unused bandwidth, such as is in the apparatus 200, as discussed above. Further at block 445, the upgraded packet is forwarded as part of the third data flow (e.g., macroflow 206).

At block 450, in the event the data packet is marked with the second marker type (e.g., locally "R" for the microflow 202) and the third rate of traffic is greater than the second threshold (e.g., locally "R" for the macroflow 206), the packet may be discarded. Various approaches exist for discarding the packet. For instance, the packet may be immediately discarded when the determination is made to mark the packet with a final color "R." Alternatively, for example, the packet may be forwarded to a data queuing structure with admission control and be discarded by the queuing structure. Other alternatives also exist. For instance, if congestion is not present at the data queuing structure, packets marked "R" as their final color may still be admitted to the data queuing structure. For instance, if the data queue occupancy is below a "red" threshold, packets with a final color marking of "R" may be admitted. If the queue occupancy is above the red threshold, the packets would be discarded in this example. A functionally similar threshold could be used for green packets, where the green threshold is higher than the red threshold. As an example, a red threshold may be set at twenty-five percent queue occupancy, while a green threshold may be set at ninety percent queue occupancy, as one example. An embodiment of such a data queuing structure with admission control is described in further detail below with respect to FIG. 9

Figure 5:
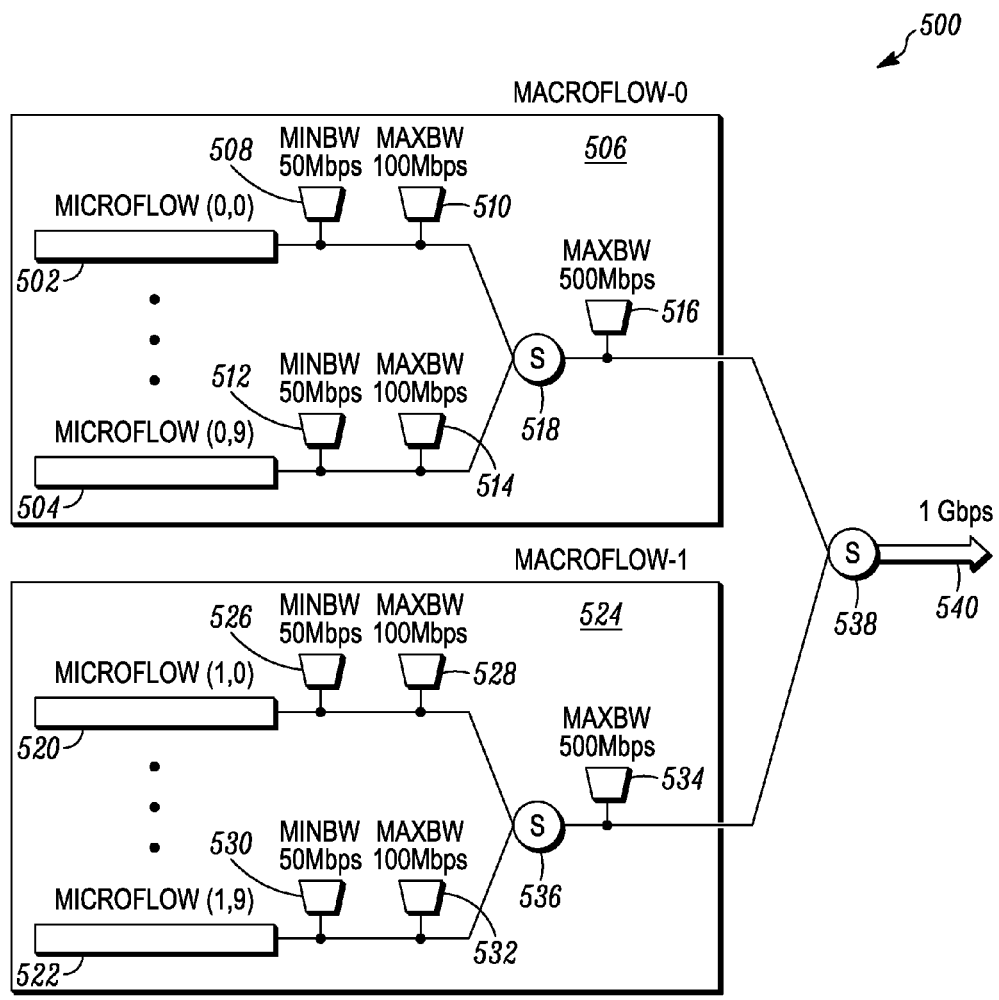
FIG. 5 is a block diagram illustrating another example embodiment of a data communication apparatus for implementing meter-based hierarchical bandwidth sharing.

FIG. 5 is a block diagram that illustrates another apparatus 500 for data communication that may be used to implement meter-based hierarchical bandwidth sharing. The apparatus 500 is similar to the apparatus 200 in a number of respects. For instance, a set of microflows 502 . . . 504 is combined, using scheduler 518 to form a first macroflow 506. Also, a second set of microflows 520 . . . 522 are combined, using a scheduler 536 to form a second macroflow 524. The macroflows 506 and 524 are combined, using a scheduler 538 to form a data flow 540. The macroflow 506 is metered in similar fashion as the macroflow 206 using a single token bucket meter 516. Likewise, the macroflow 524 is metered in similar fashion as the macroflow 220 using a single token bucket meter 534.

In the apparatus 500, the microflows are metered using two token buckets, or using dual-token bucket meters. For instance, the microflow 502 is metered using a first token bucket 508, which is used to ensure that the microflow 502 has access to its allocated ("minimum") bandwidth. The microflow 502 is also metered by a second token bucket 510, which is used to ensure that the microflow 502 does not exceed an upper ("maximum") bandwidth limit. The microflows 504, 520 and 522 are similarly metered, respectively, by the token bucket pairs of 512/514, 526/528 and 530/532. For purposes of illustration, the metering of microflow 502 will be discussed below.

As with the token bucket meter 208 for the microflow 202 in the apparatus 200, the token bucket 508 is used to ensure that the microflow 502 has access to its allocated "guaranteed" bandwidth. In an example embodiment, tokens may be periodically added to a token count of the meter 508 at a rate proportional to the allocated bandwidth and up to a bucket depth corresponding with a CBS for the microflow 502. As discussed above with respect to the meter 208, the allocated bandwidth metered by the token bucket 508 may be referred to as the CIR of the microflow 502.

In the apparatus 500, the token bucket 510 meters the use of excess bandwidth by the microflow 502 above its CIR and up to an upper limit, in this case 100 Mbps. The difference between the CIR of the microflow 502 and the upper bandwidth limit may be referred to as the excess information rate (EIR), which in this case would be 50 Mbps (i.e., 100 Mbps-50 Mbps). In an example embodiment, tokens may be periodically added to a token count of the meter 510 at a rate proportional to the EIR and up to a bucket depth corresponding with an excess bucket size of the token bucket 510. Because two rates (e.g., the CIR and the EIR) are being monitored for the microflows in the apparatus 500, packet marking may be accomplished using a three color scheme for microflows, as is described below.

Figure 6:
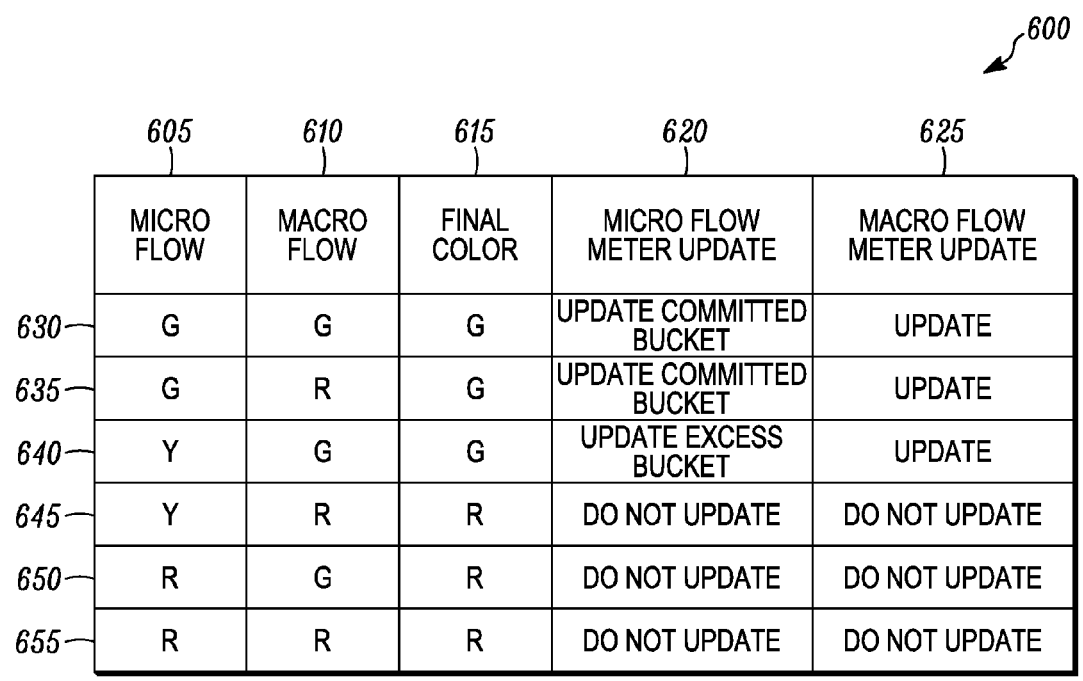
FIG. 6 is a table illustrating an example embodiment of data packet marking that may be employed in conjunction with the apparatus illustrated in FIG. 5.

FIG. 6 is a table 600 illustrating an example embodiment for packet marking that may be employed with the apparatus 500 illustrated in FIG. 5. The packet marking illustrated in FIG. 6 accounts for metering of both the CIRs and EIRs for the microflows of the apparatus 500. In the table 600, column 605 indicates the state of a microflow (e.g., dual-bucket) meter when a packet is received. If the token bucket 508 indicates that the microflow is operating within its CIR (e.g., the token bucket 508 has a positive token count) when the packet is received, the packet is marked as green ("G"). However, if the token bucket 508 indicates that the microflow is operating above its CIR when the packet is received (e.g., the token count of the bucket 508 is zero or negative), the token bucket 510 may be examined to determine if the microflow 502 is operating within its EIR (e.g., the token bucket 510 has a positive token count). If the microflow is operating within its EIR, the packet is marked as yellow ("Y"). Further, if the token buckets 508 and 510 indicate that the microflow 502 is operating above the CIR+EIR (e.g., the token counts of the buckets 508 and 510 are both zero or negative), the packet is marked as red ("R").

As with column 310 of the table 300, the color markings in column 605 may be referred to as the microflow "local color," as those markings indicate whether the microflow (e.g., based on its dual token bucket) is operating within its CIR, operating within its EIR, or is out-of-profile. Therefore the packet markings in column 605 indicate the local state of an associated microflow dual token bucket meter.

Column 610 in FIG. 6 indicates the state of the macroflow meter when the packet is received and may be referred to as the macroflow local color. As discussed above with respect to FIG. 3, if the macroflow meter indicates the macroflow is in profile when the packet is received, the packet is marked (locally) as green "G." If the macroflow meter indicates that the macroflow is out-of-profile when the packet is received, the packet is marked locally as red "R."

Column 615 in FIG. 6 indicates what the final color of a packet would be in each instance illustrated in the table 600. In this example, the final color of a packet may depend on its microflow local color and its macroflow local color, such as described in further detail below. Columns 620 and 625 indicate, respectively, whether token counts of the microflow CIR bucket (e.g., token bucket 508), the EIR bucket (e.g., the token bucket 510) and/or the macroflow meter (e.g., single token bucket meter 516) are updated (e.g., token counts reduced) for a given packet in the various situations illustrated in FIG. 6.

Row 630 of table 600 illustrates the situation where a microflow is operating within its CIR and an associated macroflow is operating in-profile when a given packet of the microflow is received. Accordingly, the packet would be marked locally as "G" for the microflow and locally as "G" for the associated macroflow. In this instance, as shown in column 615, the final color of the packet would be "G" as well. Typically, the packet would be forwarded onto to its destination. In some embodiments, however, the packet could still be dropped due to congestion at, for example, an egress data queuing structure. In this situation, the CIR bucket (e.g., bucket 508) and the macroflow bucket (e.g., 516) would be updated, or have their token counts reduced by an amount corresponding with the size of the packet.

Row 635 of table 600 illustrates the situation where a microflow is operating within its CIR and an associated macroflow is operating out-of profile when a given packet of the microflow is received. Accordingly, the packet would be marked locally as "G" for the microflow and locally as "R" for the associated macroflow. In this instance, as shown in column 615, the final color of the packet would be "G" as the microflow is operating within its CIR (e.g., at or below its guaranteed bandwidth). As shown in columns 620 and 625, both the committed bucket and the macroflow meter would be updated. In this instance, the token count of the macroflow meter would go negative, or further negative. As discussed above, this outcome is desirable in certain embodiments as it may ensure that upgrades are not available for a period of time when additional microflows begin communicating in situations where one or more other microflows have been operating above their CIR and using excess bandwidth. As previously discussed, using such an approach would allow each microflow to have access to its CIR. Packet upgrades would not be available again until the macroflow meter achieved a positive token count.

Row 640 illustrates the situation where a microflow is operating above its CIR but within its EIR and an associated macroflow is operating in-profile when a given packet of the microflow is received. Here the packet would be marked locally as "Y" for the microflow and locally as "G" for the macroflow. In this instance, the final color of the packet would be marked as "G", or the packet would be upgraded to allow the microflow to utilize the excess bandwidth of the macroflow. As shown in columns 620 and 625, the token counts for an excess bucket (e.g., bucket 510) and the macroflow bucket (e.g., token bucket meter 516) would be updated by reducing their token counts by an amount corresponding with the size of the packet.

Row 645 illustrates the situation where a microflow is operating above its CIR but within its EIR and an associated macroflow is operating out-of-profile when a given packet of the microflow is received. Here the packet would be marked locally as "Y" for the microflow and locally as "R" for the macroflow. In this instance, upgrades would not be available as the macroflow is operating out-of-profile. Accordingly, the packet is marked with a final color of "R" and none of the token buckets for the microflow or macroflow are updated. Typically the packet in this situation is discarded, though in some embodiments the packet may be forwarded to its destination if congestion does not exist downstream, such as described above and in further detail below.

Rows 650 and 655 illustrate situations where a microflow is operating above both its EIR and CIR. In the situation of row 650, an associated macroflow is operating in-profile, while in the situation of row 655, the macroflow is operating out-of-profile. In both of these situations, the final color of the packet would be marked as "R" because the microflow is operating above its EIR, which represents an upper bandwidth limit for the macroflow. Therefore, even if the associated macroflow is operating in-profile, upgrades would not be given to packets that are marked locally as "R" for microflows in this embodiment. In these situations, none of the token buckets for the microflow or macroflow would be updated.

Figure 7:
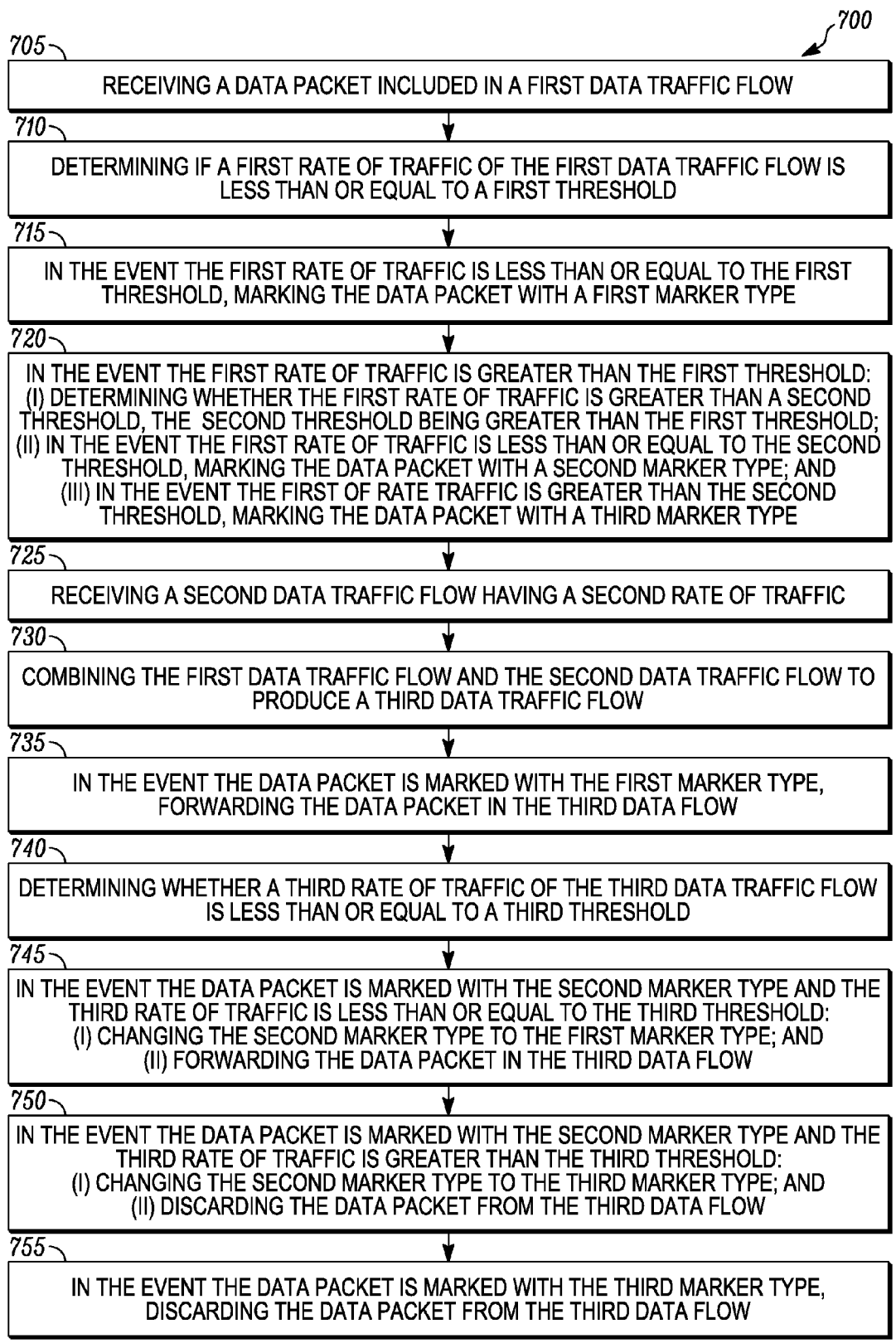
FIG. 7 is a flow chart illustrating an example embodiment of a method for data communication that may be implemented in the apparatus illustrated in FIG. 5.

FIG. 7 illustrates an example embodiment of a method 700 of meter-based hierarchical bandwidth sharing. The method 700 may be implemented in the apparatus 500 of FIG. 5 using the packet marking illustrated in FIG. 6. Of course, the method 700 could be implemented in any number of data communication apparatus and is not limited to the approaches illustrated in FIGS. 5 and 6. However, for purposes of illustration, the method 700 will be described with additional reference to FIGS. 5 and 6.

At block 705 of the method 700, a data packet is received as part of a first data traffic flow. The packet may be, for example, part of a first microflow, such as the microflow 502. At block 710, it is determined whether a first rate of traffic of the first data traffic flow is less than or equal to a first threshold. For instance, the token bucket 508 may be examined to determine if the microflow 502 is operating at or below its CIR. If a positive token count is present in the meter 508, the first rate of traffic would be determined to be less than or equal to the first threshold (e.g., the CIR or "guaranteed" data rate). If the meter 508 has a zero or negative token count, the first rate of traffic would be determined to be greater than the first threshold, indicating the microflow is operating above its CIR. At block 715, in the event the first rate of traffic is determined to be less than or equal to the first threshold (the CIR), the packet may be marked with a first marker type (e.g., "G") as the local microflow color, such as discussed above.

At block 720, in the event the first rate of traffic is greater than the first threshold (e.g., the microflow 502 is operating above its CIR), a determination may then be made as to whether the first rate of traffic is greater than a second threshold (e.g., an EIR for the microflow), where the second threshold (EIR) is greater than the first threshold (CIR). In the event the first rate of traffic is less than or equal to the second threshold, the data packet may be marked with a second marker type (e.g., "Y") as the local microflow color, such as discussed in the above example with respect to FIG. 6. However, in the event the first of rate traffic is greater than the second threshold (EIR), the data packet may then be marked with a third marker type ("R") as the local color for microflow, as also discussed above with respect to FIG. 6.

At block 725 of the method 700, a second data traffic flow having a second rate of traffic may be received. At block 730, the first data traffic flow may combined with the second data traffic flow to produce a third data traffic flow. Of course, the first and second data traffic flows may simply be combined with each other, or may be combined with additional data traffic flows to form the third data traffic flow.

At block 735, in the event the data packet is marked with the first marker type (locally "G" for the microflow), the data packet may be forwarded in the third data flow. This may be done regardless of the state of the third traffic flow (e.g., the macroflow) because the first data traffic flow (e.g., microflow) is operating below the first threshold (e.g., within its CIR). These situations are illustrated by rows 630 and 635 of the table 600 shown in FIG. 6.

At block 740, it may be determined whether a third rate of traffic of the third data traffic flow is less than or equal to a third threshold (e.g., a macroflow bandwidth limit). At block 745, in the event the data packet is marked with the second marker type (e.g., locally as "Y" for the microflow) and the third rate of traffic is less than or equal to the third threshold (e.g., the macroflow is in profile), the packet's marker may be changed from the second marker type to the first marker type (e.g., the packet may be upgraded and given a final color of "G," such as illustrated by row 640 of the table 600). In this instance, the packet may be forwarded in the third data flow, such as in the fashions described herein.

At block 750, in the event the data packet is marked with the second marker type (e.g., marked locally "Y" for the microflow) and the third rate of traffic is greater than the third threshold (e.g., the macroflow is out-of-profile), the marker of the packet may be changed from the second marker type to the third marker type (e.g., marked with a final color of "R" as no upgrades are available due the out-of-profile state of the macroflow). In this situation, the packet may be discarded from the third data flow. Alternatively, the packet may be sent to a data queuing structure with admission control as described above and in further detail below.

At block 755, if the packet is marked with the third marker type (e.g., locally as "R" for the microflow, the packet may be discarded regardless of the rate of traffic of the third data flow (e.g, the macroflow). Such examples were discussed above with regard to rows 650 and 655 of the table 600 illustrated in FIG. 6.

Figure 8:
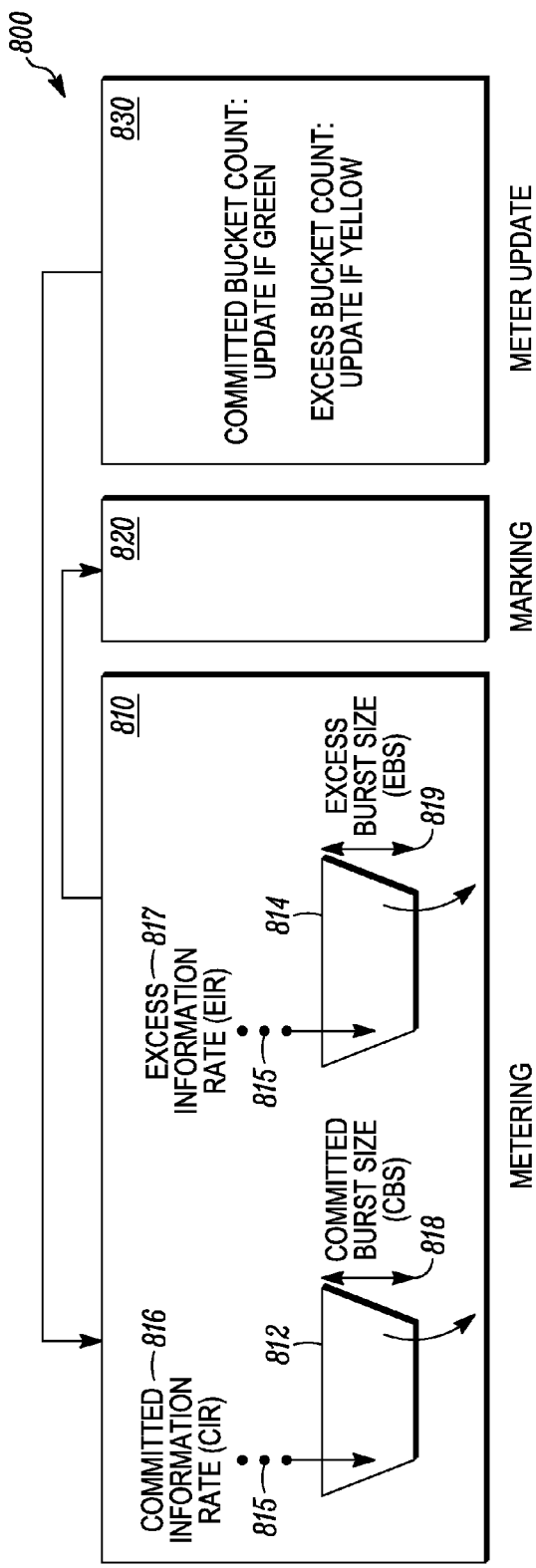
FIG. 8 is a block diagram illustrating an example embodiment of an apparatus that may be used for metering data flow and associated marking of packets.

FIG. 8 is block diagram of a two-rate three-color meter (trTCM) 800 that may be used for metering microflows in the apparatus 500 illustrated in FIG. 5. The trTCM 800 includes dual-token buckets 810, packet marking 820 and meter updating 830. The dual-token bucket 810 includes a CIR bucket 812 and an EIR bucket 814. As was discussed above, tokens 815 are added to the CIR bucket 812 at rate that is proportional with a CIR 816 for an associated microflow. Likewise, tokens 815 are added to the EIR bucket 814 at a rate that is proportional with an EIR 817 for the associated microflow. As was also discussed above, the CIR bucket 812 is limited in its token count by the CBS 818 (e.g., the CIR bucket 812's depth). Likewise, the EIR bucket 814 is limited in its token count by an excess burst size (EBS) 810 (e.g., the EIR bucket 814's depth).

The packet marking block 820 may mark packets in accordance with the embodiments illustrated and described above with respect to FIGS. 5-7. Also, the meter update block 830 may update token counts of the CIR bucket 812 and the EIR bucket 814 in accordance with the embodiments illustrated and described above with respect to FIGS. 5-7.

Figure 9:
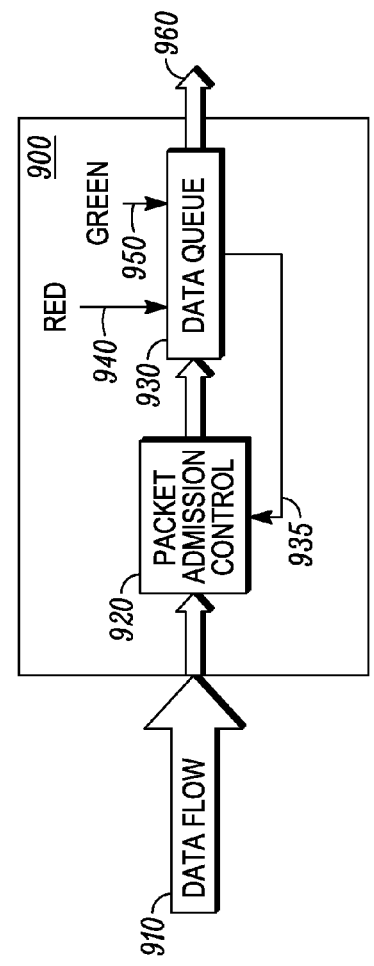
FIG. 9 is a block diagram of an example embodiment of a data queue with admission control.

FIG. 9 illustrates a data queuing structure 900 that includes packet admission control 920. In the queuing structure 900, packets that are admitted by the admission control 920 may be queued in a data queue 930 for transmission to their respective destinations.

The data queuing structure 900 may receive a data flow 910 that includes packets that have been marked in accordance with the packet marking embodiments illustrated in FIGS. 3 and 6, or using any other packet marking approach. The packet admission control 920 may admit or discard packets based only on their final color. In such an approach, any packet marked with a final color "R" would be discarded, while any packet marked with a final color "G" would be admitted to the data queuing structure 900 and placed in data queue 930 to be transmitted to its final destination.

Alternatively, packets may be admitted to the data queuing structure 900 by the packet admission control 920 based on their final color and on data occupancy of the data queue 930. For instance if a packet with a final color of "R" arrives at the packet admission control 920, the packet admission control 920 may determine the amount of data presently in the data queue via line 935. If the occupancy of the data queue 930 is below a red threshold (indicating there is very little or no data congestion) the packet admission control 920 may admit the packet and place it in the data queue 930 for delivery. Conversely, if the data occupancy is above the red threshold 940, the packet may be discarded. Green packets may be similarly admitted and discarded based on a green threshold 950 for queue occupancy, where the green threshold 950 is higher than the red threshold 940. The admission control 920 may operate without the use of the thresholds, using both thresholds or using only a single threshold. For instance, only the red threshold 940 may be used, while all packets marked with a final color "G" are admitted to the queue 930.

Figure 10:
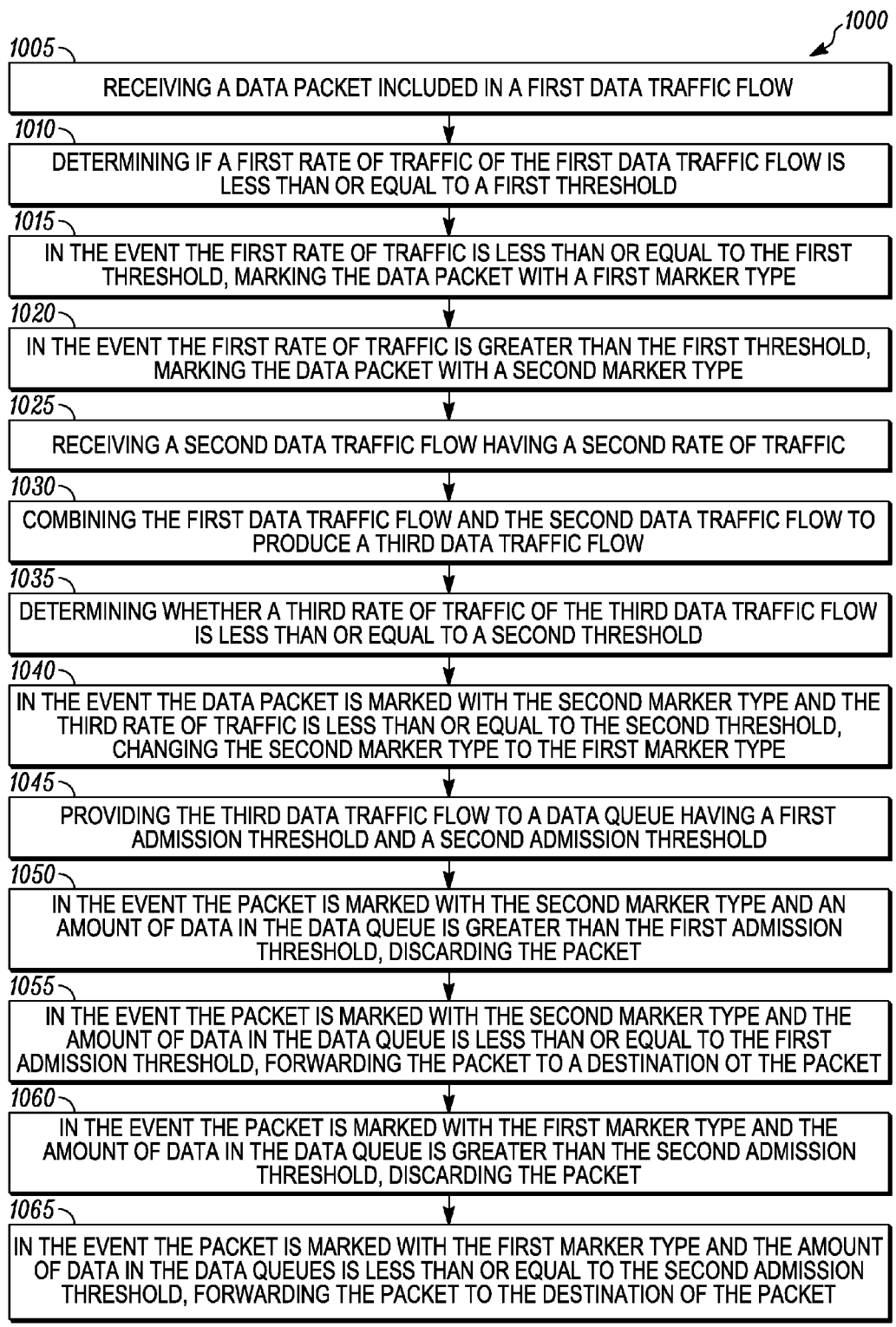
FIG. 10 is a flowchart illustrating yet another example embodiment of a method for data communication.

FIG. 10 is a flowchart illustrating an example embodiment of a method 1000 for meter-based hierarchical bandwidth sharing including preferential dropping of packets using the data queuing structure 900 illustrated in FIG. 9. It will be appreciated that a preferential packet dropper that is not part of a data queuing structure may alternatively, perform the packet admission and discard functions of admission control 920. As another alternative, the packet dropping functions may be carried out as part of the packet marking process. Still other alternatives may exist.

At block 1005 of the method 1000, a data packet may be received that is included in a first data traffic flow. At block 1010, it may be determined if a first rate of traffic of the first data traffic flow is less than or equal to a first threshold (e.g., a microflow's CIR). At block 1015, in the event the first rate of traffic is less than or equal to the first threshold, the data packet may be marked with a first marker type (e.g., locally as "G" for the microflow). At block 1020, in the event the first rate of traffic is greater than the first threshold, the data packet may be marked with a second marker type (e.g., locally "R" for the microflow).

At block 1025, a second data traffic flow having a second rate of traffic may be received. At block 1030, the first and second data traffic flows may be combined to produce a third data traffic flow (e.g., a macroflow). At block 1035, it may be determined whether a third rate of traffic of the third data traffic flow is less than or equal to a second threshold (e.g., the macroflow's bandwidth limit). At block 1040, in the event the data packet is marked with the second marker type ("R") and the third rate of traffic is less than or equal to the second threshold, the second marker type may be changed to the first marker type (e.g., the packet may be upgraded, such as illustrated in row 380 of the table 300 in FIG. 3).

At block 1045, the third data traffic flow is provided to a data queue having a first admission threshold (e.g., red threshold 940) and a second admission threshold (e.g., green threshold 950). At block 1050, in the event the packet is marked with the second marker type ("R") and an amount of data in the data queue is greater than the first admission threshold (red threshold), the packet may be discarded. At block 1055, in the event the packet is marked with the second marker type ("R") and the amount of data in the data queue is less than or equal to the first admission threshold (red threshold), the packet may be forwarded to a destination of the packet.

At block 1060, in the event the packet is marked with the first marker type ("G") and the amount of data in the data queue is greater than the second admission threshold (green threshold), the packet may be discarded. At block 1065, in the event the packet is marked with the first marker type ("G") and the amount of data in the data queues is less than or equal to the second admission threshold (green threshold), the packet may be forwarded to its destination.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method for communicating data comprising:
receiving, at a network device, a data packet included in a first data traffic flow;
determining, by the network device, if a first rate of traffic of the first data traffic flow is less than or equal to a first threshold;
in the event the first rate of traffic is less than or equal to the first threshold, marking, by the network device, the data packet with a first marker type;
in the event the first rate of traffic is greater than the first threshold, marking, by the network device, the data packet with a second marker type;
receiving, at the network device, a second data traffic flow having a second rate of traffic;
combining, by the network device, the first data traffic flow and the second data traffic flow to produce a third data traffic flow;
in the event the data packet is marked with the first marker type, forwarding, by the network device, the data packet in the third data flow;
determining, by the network device, whether a third rate of traffic of the third data traffic flow is less than or equal to a second threshold;
in the event the data packet is marked with the second marker type and the third rate of traffic is less than or equal to the second threshold:
changing, by the network device, the second marker type to the first marker type; and
forwarding, by the network device, the data packet in the third data flow; and
in the event the data packet is marked with the second marker type and the third rate of traffic is greater than the second threshold, discarding, by the network device, the data packet.

2. The method of claim 1, wherein:
the first marker type designates the data packet as green; and
the second marker type designates the data packet as red.

3. The method of claim 1, wherein:
the first marker type designates the data packet as green; and
the second marker type designates the data packet as yellow.

4. The method of claim 1, further comprising:
combining, by the network device, the third traffic flow with a fourth data traffic flow having a fourth rate of traffic to produce a fifth data traffic flow having a fifth rate of traffic; and
determining, by the network device, whether to discard the data packet or forward the data packet in the fifth data traffic flow based on the data packet's marker type and the fifth rate of traffic.

5. The method of claim 1, further comprising:
in the event the first rate of traffic is greater than the first threshold:
determining, by the network device, whether the first rate of traffic is greater than a third threshold, the third threshold being greater than the first threshold; and
in the event the first rate of traffic is greater than the third threshold:
marking, by the network device, the data packet with a third marker type in place of marking the packet with the second marker type; and discarding, by the network device, the data packet from the third data flow.

6. The method of claim 5, wherein:
the first marker type designates the packet as green;
the second marker type designates the packet as yellow; and
the third marker type designates the packet as red.

7. The method of claim 1, wherein:
determining whether the first rate of traffic is less than or equal to the first threshold comprises determining whether a positive token count is present in a single token bucket meter associated with the first data traffic flow;
determining whether the third rate of traffic is less than or equal to the second threshold comprises determining whether a positive token count is present in a single token bucket meter associated with the third data traffic flow; and
in the event the token count of the single token bucket meter associated with the first data traffic flow is positive, forwarding, by the network device, the data packet in the third data flow comprises:
decrementing, by the network device, the token count of the single token bucket meter associated with the first data traffic flow by an amount of tokens proportional to a size of the data packet; and
decrementing, by the network device, the token count of the single token bucket meter associated with the third data traffic flow by the amount of tokens proportional to the size of the data packet.

8. The method of claim 1, wherein in the event the data packet marker is changed from the second marker type to the first marker type, forwarding, by the network device, the data packet in the third data flow comprises decrementing a token count of a single token bucket meter associated with the third data traffic flow by an amount of tokens proportional to a size of the data packet.

9. The method of claim 1, wherein:
determining whether the first rate of traffic is less than or equal to the first threshold comprises determining whether a positive token count is present in a first token bucket of a two-rate three-color meter (trTCM) associated with the first data traffic flow;
determining whether the third rate of traffic is less than or equal to the second threshold comprises determining whether a positive token count is present in a single token bucket meter associated with the third data traffic flow; and
in the event the token count of the first token bucket is positive, forwarding the data packet in the third data flow comprises:
decrementing, by the network device, the token count of the first token bucket by an amount of tokens proportional to a size of the data packet; and
decrementing, by the network device, the token count of the single token bucket meter associated with the third data traffic flow by the amount of tokens proportional to the size of the data packet.

10. The method of claim 9, wherein in the event the data packet marker is changed from the second marker type to the first marker type, forwarding the data packet in the third data flow comprises decrementing, by the network device, a token count of a second token bucket of the trTCM by the amount of tokens proportional to the size of the data packet.

11. The method of claim 1, further comprising:
at the network device, periodically adding tokens to a first single token bucket meter associated with the first data traffic flow, wherein:
the first single token bucket meter is configured to determine whether the first traffic rate is less than or equal to the first threshold based on a token count of the first single token bucket meter; and
tokens are added to the first token bucket meter at a rate proportional to the first threshold and up to an amount corresponding with a depth of the first token bucket meter; and
at the network device, periodically adding tokens to a second single token bucket meter associated with the third data traffic flow, wherein:
the second single token bucket meter is configured to determine whether the third traffic rate is less than or equal to the second threshold based on a token count of the second single token bucket meter; and
tokens are added to the second token bucket meter at a rate proportional to the second threshold up to an amount corresponding with a depth of the second token bucket meter.

12. The method of claim 1, further comprising:
at the network device, periodically adding tokens to a first token bucket of a two-rate three-color meter (trTCM) associated with the first data traffic flow, wherein:
the trTCM is configured to determine whether the first traffic rate is less than or equal to the first threshold based on a token count of the first token bucket; and
tokens are added to the first token bucket at a rate proportional to the first threshold and up to an amount corresponding with a depth of the first token bucket;
periodically adding tokens to a second token bucket of the trTCM, wherein:
the trTCM is configured to determine whether the first traffic rate is less than or equal to a third threshold based on a token count of the second token bucket, the third threshold being greater than the second threshold; and
tokens are added to the second token bucket at a rate proportional to the third threshold minus the first threshold and up to an amount corresponding with a depth of the second token bucket; and
at the network device, periodically adding tokens to a single token bucket meter associated with the third data traffic flow, wherein:
the single token bucket meter is configured to determine whether the third traffic rate is less than or equal to the second threshold based on a token count of the single token bucket meter; and
tokens are added to the single token bucket meter at a rate proportional to the second threshold up to an amount corresponding with a depth of the single token bucket meter.

13. The method of claim 1, wherein:
the first data traffic flow is a data traffic flow associated with a first service provider subscriber;
the second data traffic flow is a data traffic flow associated with a second service provider subscriber; and
the third data traffic flow is a data traffic flow associated with the service provider.

14. The method of claim 1, wherein:
the first data traffic flow is a data traffic flow associated with a first traffic service for a user;
the second data traffic flow is a data traffic flow associated with a second traffic service for a user; and the third data traffic flow is a data traffic flow associated with the user.

15. A method for communicating data comprising:

receiving a data packet included in a first data traffic flow;

determining if a first rate of traffic of the first data traffic flow is less than or equal to a first threshold;

in the event the first rate of traffic is less than or equal to the first threshold, marking the data packet with a first marker type;

in the event the first rate of traffic is greater than the first threshold, marking the data packet with a second marker type;

receiving a second data traffic flow having a second rate of traffic;

combining the first data traffic flow and the second data traffic flow to produce a third data traffic flow;

determining whether a third rate of traffic of the third data traffic flow is less than or equal to a second threshold;

in the event the data packet is marked with the second marker type and the third rate of traffic is less than or equal to the second threshold, changing the second marker type to the first marker type;

providing the third data traffic flow to a data queue having a first admission threshold and a second admission threshold;

in the event the packet is marked with the second marker type and an amount of data in the data queue is greater than the first admission threshold, discarding the packet;

in the event the packet is marked with the second marker type and the amount of data in the data queue is less than or equal to the first admission threshold, forwarding the packet to a destination of the packet;

in the event the packet is marked with the first marker type and the amount of data in the data queue is greater than the second admission threshold, discarding the packet; and in the event the packet is marked with the first marker type and the amount of data in the data queue is less than or equal to the second admission threshold, forwarding the packet to the destination of the packet.

16. The method of claim 15, wherein the first admission threshold is less than the second admission threshold.

17. The method of claim 15, wherein:

the first marker type designates the data packet as green; and the second marker type designates the data packet as red.

18. The method of claim 15, wherein:

determining whether the first rate of traffic is less than or equal to the first threshold comprises determining whether a positive token count is present in a single token bucket meter associated with the first data traffic flow;

determining whether the third rate of traffic is less than or equal to the second threshold comprises determining whether a positive token count is present in a single token bucket meter associated with the third data traffic flow; and in the event the token count of the single token bucket meter associated with the first data traffic flow is positive, providing the data packet to the data queue in the third data traffic flow comprises:

decrementing the token count of the single token bucket meter associated with the first data traffic flow by an amount of tokens proportional to a size of the data packet; and decrementing the token count of the single token bucket meter associated with the third data traffic flow by the amount of tokens proportional to the size of the data packet.

19. The method of claim 15, wherein in the event the data packet marker is changed from the second marker type to the first marker type, providing the data packet to the data queue comprises decrementing a token count of a single token bucket meter associated with the third data traffic flow by an amount of tokens proportional to a size of the data packet.

20. A method for communicating data comprising:

receiving, at a network device, a data packet included in a first data traffic flow;

determining, by the network device, if a first rate of traffic of the first data traffic flow is less than or equal to a first threshold;

in the event the first rate of traffic is less than or equal to the first threshold, marking, by the network device, the data packet with a first marker type;

in the event the first rate of traffic is greater than the first threshold:

determining, by the network device, whether the first rate of traffic is greater than a second threshold, the second threshold being greater than the first threshold;

in the event the first rate of traffic is less than or equal to the second threshold, marking, by the network device, the data packet with a second marker type; and in the event the first of rate traffic is greater than the second threshold, marking, by the network device, the data packet with a third marker type;

receiving, at the network device, a second data traffic flow having a second rate of traffic;

combining, by the network device, the first data traffic flow and the second data traffic flow to produce a third data traffic flow;

in the event the data packet is marked with the first marker type, forwarding, by the network device, the data packet in the third data flow;

determining, by the network device, whether a third rate of traffic of the third data traffic flow is less than or equal to a third threshold;

in the event the data packet is marked with the second marker type and the third rate of traffic is less than or equal to the third threshold:

changing, by the network device, the second marker type to the first marker type; and forwarding, by the network device, the data packet in the third data flow;

in the event the data packet is marked with the second marker type and the third rate of traffic is greater than the third threshold:

changing, by the network device, the second marker type to the third marker type; and discarding, by the network device, the data packet from the third data flow; and in the event the data packet is marked with the third marker type, discarding, by the network device, the data packet from the third data flow.

* * * * *

UNITED STATES PATENT AND TRADEMARK OFFICE
CERTIFICATE OF CORRECTION

| | | |
|---|---|---|
| PATENT NO. | : 7,826,352 B2 | Page 1 of 1 |
| APPLICATION NO. | : 12/198640 | |
| DATED | : November 2, 2010 | |
| INVENTOR(S) | : Bruce Kwan et al. | |

It is certified that error appears in the above-identified patent and that said Letters Patent is hereby corrected as shown below:

On Title page, in field (57), under "ABSTRACT", in column 2, line 5, delete "he first" and insert -- the first --, therefor.

In column 20, line 33, in claim 20, delete "the first of rate" and insert -- the first rate of --, therefor.

Signed and Sealed this
Fourth Day of January, 2011

David J. Kappos
*Director of the United States Patent and Trademark Office*